June 25, 1929.  N. A. CHRISTENSEN  1,718,526
VEHICLE BRAKE MECHANISM
Filed June 12, 1926   2 Sheets-Sheet 1

INVENTOR.
Niels A. Christensen
BY
ATTORNEYS.

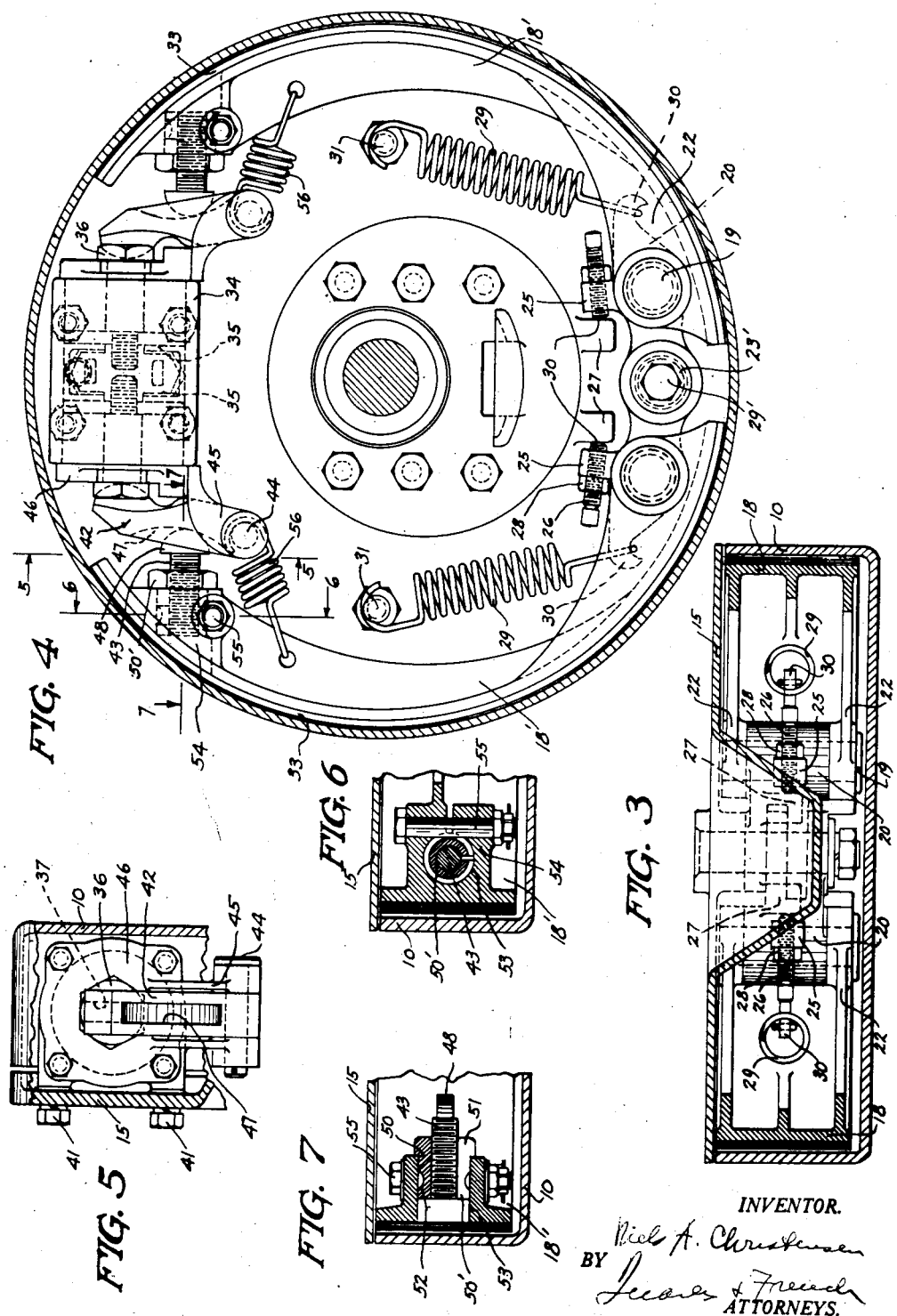

Patented June 25, 1929.

1,718,526

UNITED STATES PATENT OFFICE.

NIELS A. CHRISTENSEN, OF CLEVELAND, OHIO.

VEHICLE-BRAKE MECHANISM.

REISSUED

Application filed June 12, 1926, Serial No. 115,604. Renewed May 12, 1928.

The invention relates to brakes for automotive vehicles and trailers for such vehicles.

The object of the invention is to provide a wheel brake mechanism wherein the brake member is a shoe which is pivotally mounted and supported adjacent one end upon a link pivotally connected to a brake support and is moved into braking engagement with its drum by pressure applied to the other end of the shoe, and more particularly by a fluid-pressure-operated motor mounted with the brake drum, the construction and arrangement being such as to distribute the braking pressure substantially uniformly along the surface of the shoe, thereby preventing unequal wear of the braking surfaces and providing for efficient braking contact and hence efficient braking action.

The invention further consists in the several features hereinafter set forth and more particularly defined by claims at the conclusion hereof.

In the drawings Fig. 1 is a sectional view of brake mechanism embodying the invention viewed along the section line 1—1 of Fig. 2 where said mechanism is shown associated with the front wheel;

Fig. 3 is a detail sectional view taken on the line 3—3 of Fig. 1;

Fig. 4 is a view similar to Fig. 1, showing a modification;

Fig. 5 is a detail sectional view taken on the line 5—5 of Fig. 4;

Fig. 6 is a detail sectional view taken on the line 6—6 of Fig. 4;

Fig. 7 is a detail sectional view taken on the line 7—7 of Fig. 4.

Figure 1:
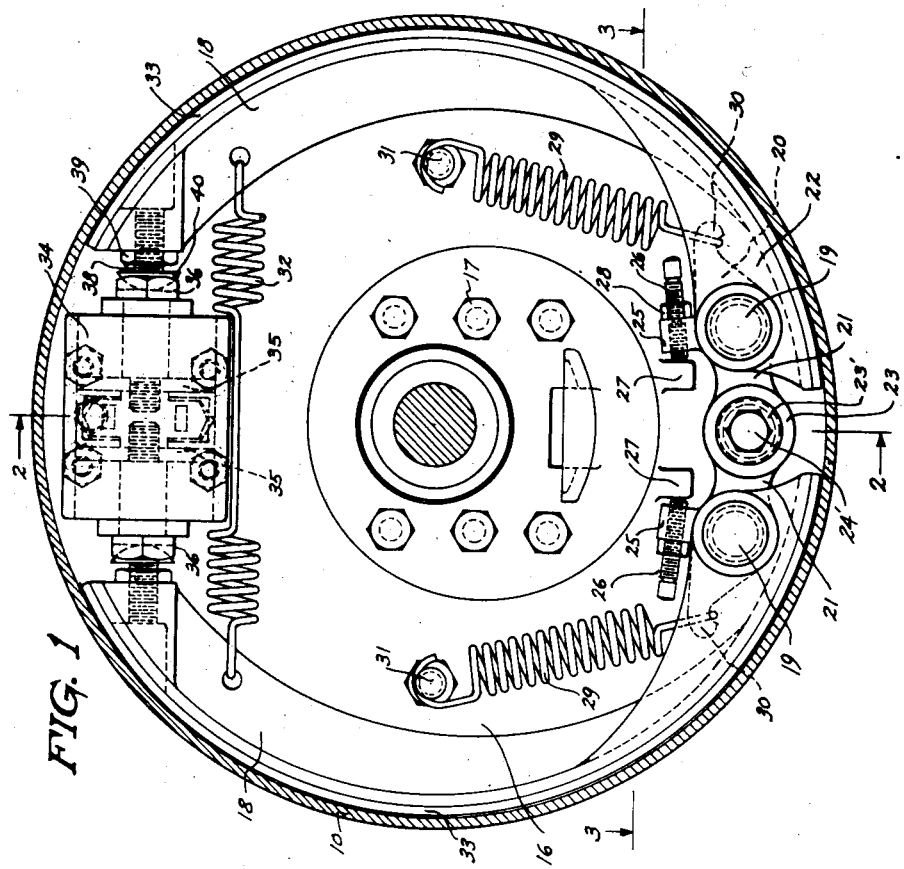
Figure 2:
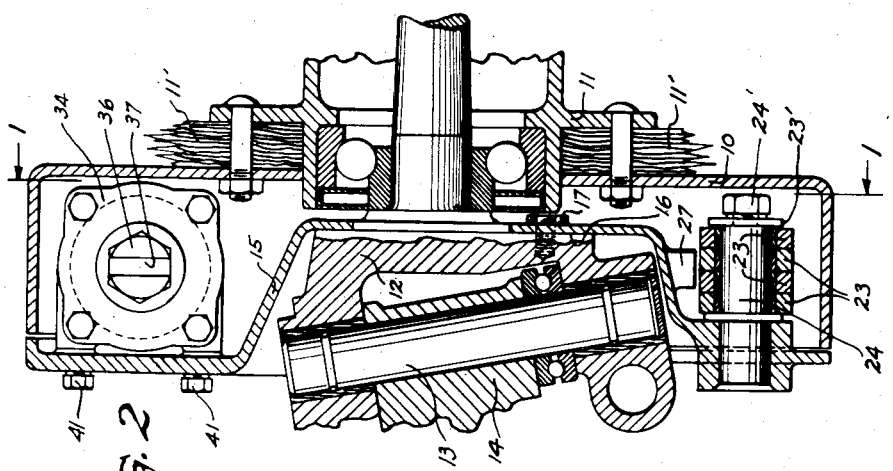
Fig. 2 is a section taken on the line 2—2 of Fig. 1.

In Figs. 1 to 3 of the drawings the numeral 10 designates the brake drum for the front wheel, suitably bolted to the hub 11 and spokes 11' of said wheel, the hub being journalled on the stub axle formed integral with the steering knuckle 12 mounted to swing about the pivot pin 13 carried by the front axle 14, and a brake support 15 in the form of a dished plate is secured to a flat surface 16 of the knuckle by bolts 17.

A pair of brake shoes 18 work within the drum 10. Each brake shoe is connected to an anchor pin 19 adjacent one end and one end 20 of an anchor pin link 21 is pivotally mounted on a pin 24 fixed to the brake support 15, the bifurcations of one link straddling those of the other link and held against longitudinal movement on the pin by a washer 23' and bolt 24'. Thus both links 21 are mounted on the same supporting pin 24 and each link carries a brake shoe. To limit the swinging movement of the shoe, in its release position, relative to the link, each link has a lug 25 in which a set or stop-screw 26 is mounted which is adapted to engage with a stop lug 27 on the brake support 15 when the shoe is in its release position, said screw 26 being locked in adjusted position by a nut 28. To move the lower ends of the shoes to release position a spring 29 is connected at one end to a lug 30 on each link and to an anchor pin 31 on the brake support at its other end. The upper ends of the shoes are moved to release position by a spring 32 connected at its ends to said shoes.

With this construction when the free ends of the shoes are thrust outwardly the shoes will be moved into braking engagement with the drum 10 and owing to the link connection above described, each shoe moves relative to and with the link so as to bring substantially its entire braking surface into contact with the drum, and the links are made very short so as to obtain an efficient braking effect. The shoes may be provided with a suitable composition brake lining 33 of metal or friction brake material.

As a means for moving the shoes into engagement with the drum I have shown, in Figs. 1 and 2, a fluid-pressure-operated motor including a brake cylinder 34 having a pair of suitably packed pistons 35 working in its bore in opposite directions, with their piston-rods extending beyond the heads of the cylinder and having polygonal heads 36 with a vertically-disposed slot 37 therein. A jack-screw 38 has its threaded shank adjustably mounted in the free end of each brake shoe and secured by a nut 39 in adjusted position so as to determine the release position of this end of the shoe, and has a flattened head 40 engaging in the slot 37 of the head 36 whereby a thrust connection between a moving part of the motor is provided and whereby the shoe is held against lateral movement relative to the drum. The brake cylinder 34 is secured by bolts 41 to the support 15 and when a fluid-pressure medium, such as compressed air, is introduced into said cylinder between the pistons said pistons will move outwardly and thus move said shoes into braking engagement with said drum in the manner previously described.

Where an increase of braking pressure over that provided by a direct connection between the motor and the shoes is desired, the construction shown in Figs. 4 to 7, inclusive, is used. In this construction the brake shoes 18' being similarly anchored and supported as in the first-described construction like reference numerals refer to these parts and the fluid-pressure-operated motor is also the same. The differences reside principally in the interposition of a multiplying lever 42 between the head 36 of each piston and an adjustable jack-screw 43 associated with the free end of each brake shoe. Each lever 42 is pivotally mounted at one end upon a pin 44 carried in lugs 45 formed integral with the cylinder head 46 of the motor and its free end is flattened to fit into the slot 37 of the head 36 of the piston rod while it has a flat-sided groove 47 intermediate its ends in which the flattened head 48 of the screw 43 works. Each screw is adjustably mounted in a split sleeve nut 50' having a threaded bore 50 and a wrench-engaging head 51 and an annular groove 52. The shank of said nut fits within the bore 53 of a split lug portion 54 of the shoe and a clamping bolt 55 extends through the split portions of said lug and engages in the groove 52 with the result that said bolt prevents longitudinal displacement of said nut at all times and upon being tightened up clamps said nut in adjusted position. Thus the loosening of the bolt 55 permits the sleeve-nut to be turned so that the jack-screw 43 may be moved relative to the shoe so as to determine the release position of the free end of the shoe, and each shoe is connected by a spring 56 with a fixed part of the brake mechanism, as the head 46, so as to move the end of said shoe to a release position upon the release of fluid-pressure from the brake cylinder. Due to the slots and flattened portions of the piston-rod, levers and screws, the brake shoes are prevented from moving laterally relative to the drum and are held in proper alined position relative thereto.

The particular association and arrangement of the lever with the brake member as above described, however, forms the subject matter of my prior United States application Ser. No. 703,952, filed April 3, 1924.

With this construction the introduction of fluid-pressure between the pistons 35 causes them to move outwardly and thus swing the levers 42 outwardly and hence move the free ends of the shoes outwardly causing a brake application in the manner previously described and as the free ends of the shoes are at less distance from the fulcrum of the lever than the point of fluid-pressure application an increased braking force results.

I desire it to be understood that this invention is not to be limited to any specific form or arrangement of parts except in so far as such limitations are specified in the claims.

What I claim as my invention is:

1. In brake mechanism of the class described, the combination with a rotatable brake drum, of a brake support, a pin on said support, anchor pin links pivotally mounted on said pin, a pair of brake shoes engageable with the drum, each shoe being connected near one end to one of said links, adjustable means associated with the link-supported end of each shoe to limit its swinging movement to release position, means acting on the free ends of said shoes to simultaneously move them into braking engagement with said drum, and means to release said shoes from said drum.

2. In brake mechanism of the class described, the combination with a rotatable brake drum, of a brake support, an anchor pin link mounted on said support, a brake shoe engageable with said drum and connected adjacent one end to said link, means including an adjustable stop-screw on said link for limiting the swinging movement of said shoe to a release position, means acting on the free end of the shoe to move it into braking engagement with said drum, and means to release said shoe from said drum.

3. In brake mechanism of the class described, the combination with a rotatable brake drum, of a pair of brake shoes engageable with said drum, anchor pin links, each of said links being respectively pivotally connected to one shoe near one end thereof and extending between the ends of said shoes, said support having a part between the link-supported ends of said shoes forming a pivotal mounting for said links, means associated with the link-supported end of each shoe to limit its release position, and means for moving said shoes into engagement with said drum.

4. In brake mechanism of the class described, the combination with a rotatable brake drum, of a pair of brake shoes engageable with said drum, anchor pin links, each of said links being respectively pivotally connected to one shoe near one end thereof and extending between the ends of said shoes, said support having a part between the link-supported ends of said shoes forming a pivotal mounting for said links, and means for moving said shoes into engagement with said drum.

In testimony whereof, I affix my signature.

NIELS A. CHRISTENSEN.